United States Patent
Bruso et al.

(10) Patent No.: US 12,235,823 B2
(45) Date of Patent: Feb. 25, 2025

(54) METHOD OF MAKING A FILE CONTAINING A SECONDARY INDEX RECOVERABLE DURING PROCESSING

(71) Applicant: Unisys Corporation, Blue Bell, PA (US)

(72) Inventors: Kelsey L. Bruso, Minneapolis, MN (US); James M. Plasek, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 17/709,781

(22) Filed: Mar. 31, 2022

(65) Prior Publication Data

US 2023/0315712 A1 Oct. 5, 2023

(51) Int. Cl.
*G06F 16/22* (2019.01)
*G06F 16/23* (2019.01)

(52) U.S. Cl.
CPC ...... *G06F 16/2343* (2019.01); *G06F 16/2246* (2019.01); *G06F 16/2322* (2019.01); *G06F 16/2365* (2019.01)

(58) Field of Classification Search
CPC ............ G06F 16/2343; G06F 16/2246; G06F 16/2322; G06F 16/2365; G06F 16/273; G06F 16/2379; G06F 16/27; G06F 16/275; G06F 11/2064; G06F 11/1469; G06F 11/1471; G06F 2201/835; G06F 2201/84; G06F 3/065
See application file for complete search history.

(56) References Cited

U.S. PATENT DOCUMENTS

| | | | | |
|---|---|---|---|---|
| 4,819,156 A | * | 4/1989 | DeLorme | G06F 11/1471 714/E11.13 |
| 5,561,795 A | * | 10/1996 | Sarkar | G06F 11/1471 |
| 5,758,356 A | * | 5/1998 | Hara | G06F 16/2246 707/696 |
| 6,983,295 B1 | * | 1/2006 | Hart | G06F 11/2071 714/E11.122 |
| 10,303,699 B1 | * | 5/2019 | Holenstein | G06F 11/3476 |
| 2005/0021567 A1 | * | 1/2005 | Holenstein | G06F 16/273 |
| 2006/0200501 A1 | * | 9/2006 | Holenstein | G06F 16/275 |
| 2009/0276430 A1 | * | 11/2009 | Bruso | G06F 16/2343 |

(Continued)

FOREIGN PATENT DOCUMENTS

WO WO-2020055977 A1 * 3/2020 ......... G06F 16/2246

*Primary Examiner* — Dennis Truong
(74) *Attorney, Agent, or Firm* — Shook, Hardy & Bacon L.L.P.

(57) ABSTRACT

A processor-based method of making a file containing a secondary index recoverable during processing of the secondary index includes: capturing a current system time as a captured system time and writing the captured system time to control information; finding writes to the file containing the secondary index; also writing the writes to an audit trail; using the captured system time in control information for the secondary index as a start time for recovery; determining if there is a primary key value in the control information; using a primary key value in the control information to traverse to a data page continuing the primary key value; placing a read-lock on the data page; creating a corresponding secondary index entry; and releasing the read-lock.

20 Claims, 9 Drawing Sheets

(56) References Cited

U.S. PATENT DOCUMENTS

| | | | |
|---|---|---|---|
| 2011/0264668 A1* | 10/2011 | Hacker | G06F 16/22 |
| | | | 707/746 |
| 2013/0290282 A1* | 10/2013 | Faerber | G06F 3/0604 |
| | | | 707/693 |
| 2014/0136788 A1* | 5/2014 | Faerber | G06F 16/23 |
| | | | 711/133 |
| 2015/0254298 A1* | 9/2015 | Bourbonnais | G06F 16/273 |
| | | | 707/610 |
| 2016/0188690 A1* | 6/2016 | Tan | G06F 16/273 |
| | | | 707/613 |
| 2016/0321142 A1* | 11/2016 | Fang | G06F 11/1474 |
| 2016/0321145 A1* | 11/2016 | Fang | G06F 11/1451 |
| 2017/0004177 A1* | 1/2017 | Faerber | G06F 16/24 |
| 2017/0193041 A1* | 7/2017 | Fuchs | G06F 16/21 |
| 2018/0165327 A1* | 6/2018 | Graefe | G06F 16/2246 |
| 2019/0050442 A1* | 2/2019 | Benke | G06F 16/2379 |
| 2020/0320051 A1* | 10/2020 | Lee | G06F 16/278 |
| 2021/0089401 A1* | 3/2021 | Park | G06F 16/2246 |

\* cited by examiner

METHOD OF MAKING A FILE CONTAINING A SECONDARY INDEX RECOVERABLE DURING PROCESSING

FIELD OF THE DISCLOSURE

This invention relates to a system and method for accelerating the retrieval processing for a database; and, more specifically, relates to constructing a secondary to accelerate search time in a database.

BACKGROUND

Computers are used today to store large amounts of data. Such information is often stored in information storage and retrieval systems referred to as databases. This information is stored and retrieved from a database using an interface known as a database management system (DBMS). One type of DBMS is called a Relational Database Management System (RDBMS). An RDBMS employs relational techniques to store and retrieve data. Relational databases are organized into tables, wherein tables include both rows and columns. A row of the horizontal table may be referred to as a record.

One type of data structure used to implement the tables of a database is a B-tree. A B-tree can be viewed as a hierarchical index. The root node is at the highest level of the tree, and may store one or more pointers, each pointing to a child of the root node. Each of these children may, in turn, store one or more pointers to children, and so on. At the lowest level of the tree are the leaf nodes, which typically store records containing data.

The below table shows a sample EMPLOYEE table with columns including employee number (empno), employee name (name), role, manager number (mgrno), and department (dept). The primary key column, empno, uniquely identifies each employee.

| empno | name | role | mgrno | dept |
|---|---|---|---|---|
| 5010 | FOSTER | SALESREP | 5234 | 200 |
| 5146 | BROWN | CLERK | 5234 | 200 |
| 5234 | WOODWORTH | MANAGER | 5784 | 200 |
| 5237 | ROCKWELL | ACCOUNTANT | 5743 | 100 |
| 5437 | MARTIN | SALESREP | 5234 | 200 |
| 5469 | ADAMS | SALESREP | 5234 | 200 |
| 5630 | GLASS | ACCOUNTANT | 5743 | 100 |
| 5702 | TURNER | CLERK | 5743 | 100 |
| 5743 | LAWSON | MANAGER | 5784 | 100 |
| 5765 | JOHNSON | CLERK | 5984 | 400 |
| 5784 | WILLIAMS | PRESIDENT |  | 300 |
| 5896 | SMITH | CLERK | 5984 | 400 |
| 5942 | FORD | SALESREP | 5234 | 200 |
| 5984 | HYDE | MANAGER | 5784 | 400 |

Figure 8:
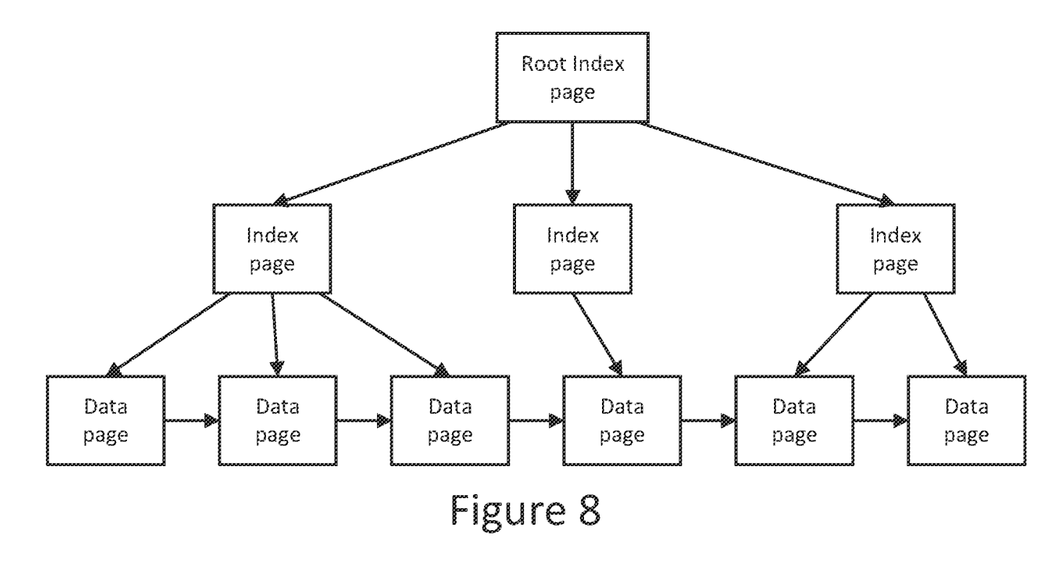
FIG. 8 is an illustration of a table's data arranged into a B-tree with index pages and data pages.

Prior mechanisms arrange the table's data into a B-tree with index pages and data pages as shown generically in FIG. 8. The data pages contain each row of the table and its data values. The index pages contain the primary key values to enable fast access to a row or set of rows based on a user query.

Figure 9:
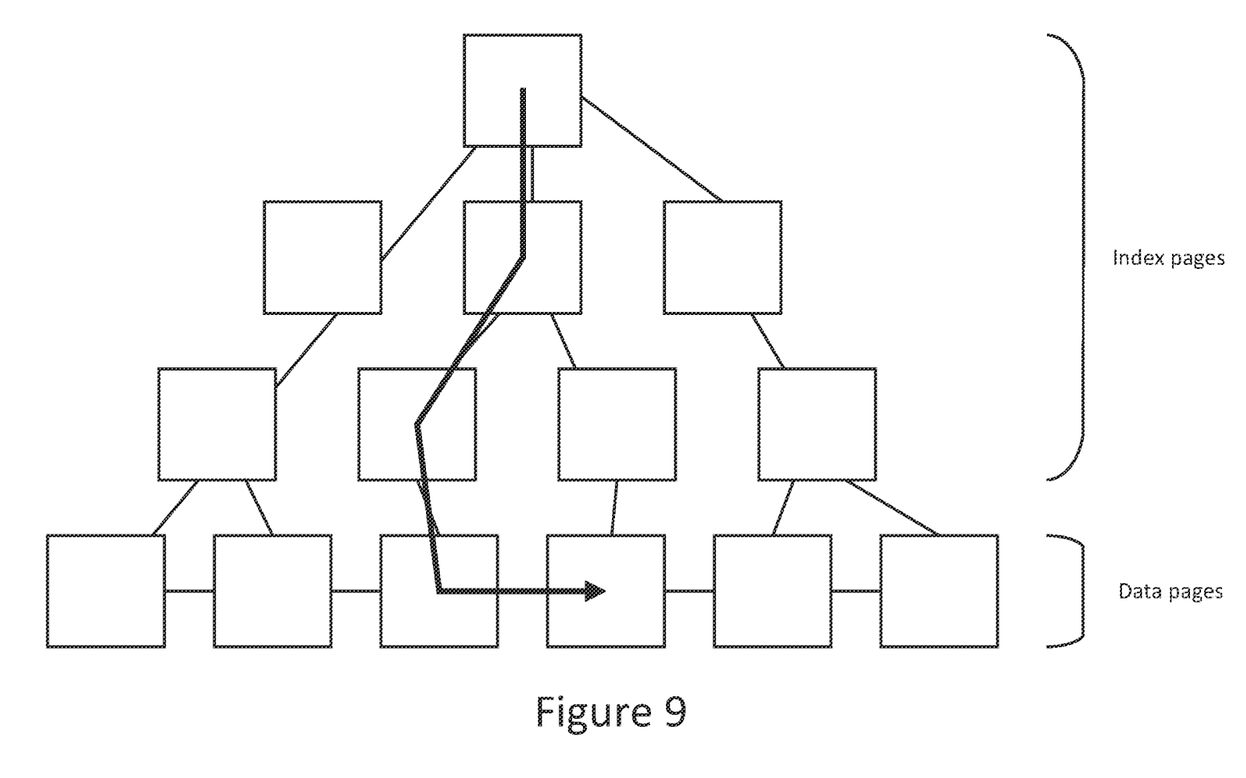
FIG. 9 is an illustration of a primary key value matching the search criteria.

When a primary key value can be used during a search, for example, names of employees have any empno greater than or equal to 5702, the DBMS follows the primary key index pages from the root index page through the intermediate index pages to the data page containing the row whose primary key value matches the search criteria. The database management system can then follow the link to the next page whose primary key value matches the search criteria as shown in FIG. 9.

A disadvantage to this type of searching is when a search is not on the primary key, for example, a search for employee name where dept equals 300. Because department is not a primary key column, the database management system must perform a brute force search, examining each row on each data page. When the tables contain tens of thousands or millions of rows, performing a brute force search takes an unacceptably long time.

One solution to accelerate the search for rows includes creating a secondary index. The DBMS creates an internal structure for the secondary index containing the dept values and their empno values (primary key). With a secondary index, the DBMS can search the secondary index to find a first match on dept equals 300 and extract the primary key empno value. Such existing index creation methodologies have limitations as well, such as locking the entire table during creating of the index. This prevents the table from being updated or used for an unacceptably long period of time. Thus, improvements are desirable.

Although described herein with respect to a Relational Database Management System (RDMS), the invention applies equally to other data management techniques such as Multi-key Sequential Access Method (MSAM) databases, Index Sequential Access Method (ISAM) databases, graph databases, embedded databases such as in Computer Aided Design (CAD) tools where the DBMS provides accelerated access using different columns (or attributes). Likewise, the invention, in addition to applying to a B-Tree or B+ Tree representation of RDBMS data and indices, applies equally to other RDBMS data organization techniques such as hash index, grid map, etc.

SUMMARY

In a first aspect of the present invention, a processor-based method of making a file containing a secondary index recoverable during processing of the secondary index includes: capturing a current system time as a captured system time and writing the captured system time to control information; finding writes to the file containing the secondary index; also writing the writes to an audit trail; using the captured system time in control information for the secondary index as a start time for recovery; determining if there is a primary key value in the control information; using a primary key value in the control information to traverse to a data page continuing the primary key value; placing a read-lock on the data page; creating a corresponding secondary index entry; and releasing the read-lock.

In a second aspect of the present invention, a computer program product, comprising a non-transitory computer readable medium comprising instructions which, when executed by a processor of a computing system, cause the processor to perform the steps of capturing a current system time as a captured system time and writing the captured system time to control information; finding writes to the file containing the secondary index; also writing the writes to an audit trail; using the captured system time in control information for the secondary index as a start time for recovery; determining if there is a primary key value in the control information; using a primary key value in the control information to traverse to a data page continuing the primary key value; placing a read-lock on the data page; creating a corresponding secondary index entry; and releasing the read-lock.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

Figure 1:
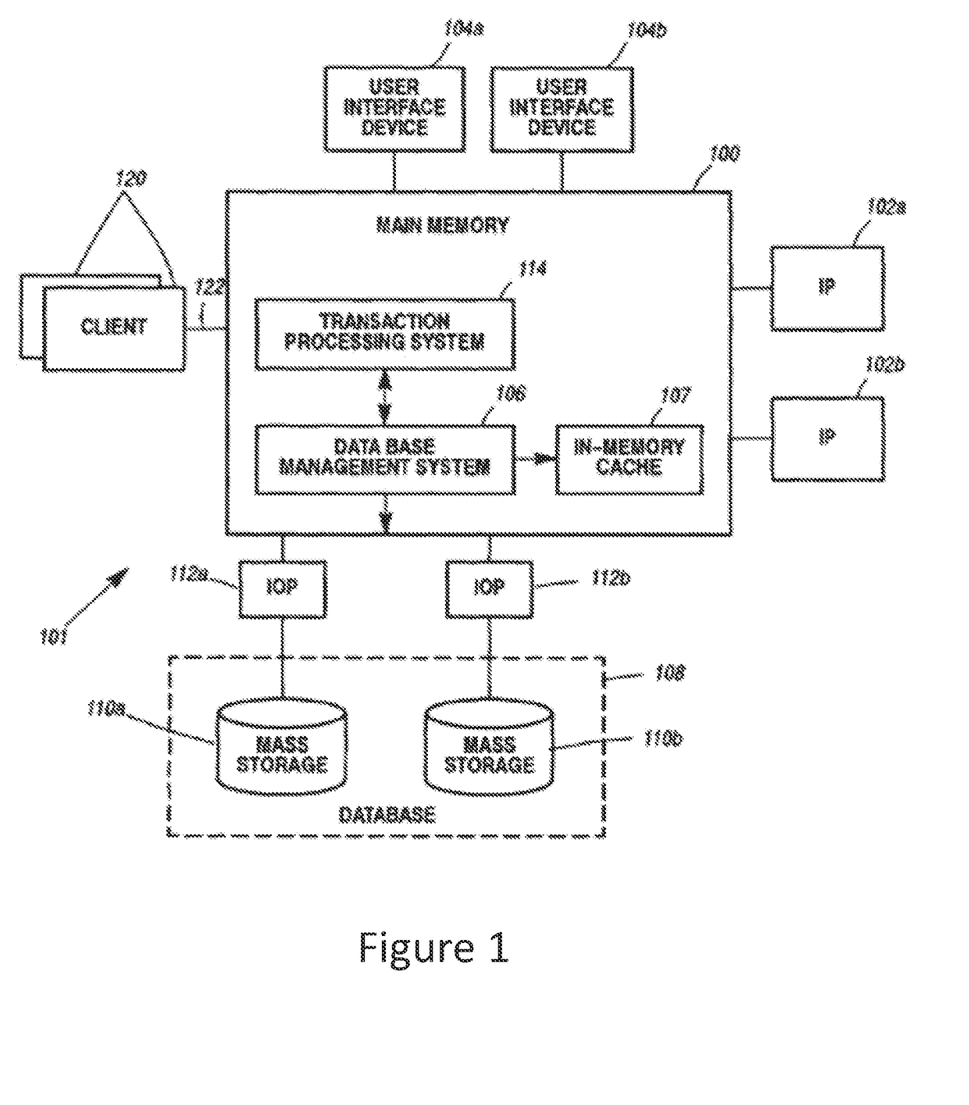
FIG. 1 is a block diagram of an exemplary data processing system that may usefully employ the current invention.

FIG. 1 is a block diagram of an exemplary data processing system 101 that may usefully employ the current invention. The data processing system may be a personal computer, a workstation, a legacy-type system, or any other type of data processing system known in the art. The system includes a main memory 100 that is interactively coupled to one or more Instruction Processors (IPs) 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A Database Management System (DBMS) 106 is loaded into main memory 100. This DBMS, which may be any DBMS known in the art, manages, and provides access to, a database 108 (shown dashed). The database may be stored on one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for storing multiple copies of the same data redundantly on multiple hard disks to improve efficient retrieval of the data, and to increase fault tolerance. Battery back-up may be provided, if desired. The transfer of data between mass storage devices and DBMS is performed by Input/Output Processors (IOPs) 112a and 112b.

The DBMS 106 may be a relational database management system (RDBMS) or other DBMS. Data records are related to a table. Data records exist in a database file and may also exist in memory in a database cache. The underlying database file is divided logically into pages. Each page may contain several database records. The basic unit of a RDBMS file management is a page, which is read into cache and written from cache to the underlying file. The contents of each data record is defined by a corresponding definition in the system catalog and in the system catalog's corresponding in-memory catalog data structure. Preferably, the system catalog is implemented as a table in the database. Modifications to the system catalog are handled like modifications to any table. Once system catalog modifications are made permanent (committed to the database), the in-memory catalog data structures can be modified to match the updated system catalog in the database.

A transaction processing system 114 may be coupled to DBMS 106. This transaction processing system receives queries for data stored within database 108 from one or more users. Transaction processing system formats these queries, then passes them to DBMS 106 for processing. DBMS 106 processes the queries by retrieving data records from, and storing data records to, the database 108. The DBMS 106 provides a locking mechanism to keep multiple users from making conflicting updates to the database. A lock can be applied to a database page or to a record on the page. A lock can be local (for this host only) or global (applies across all hosts in a multi-host or clustered environment). A global lock informs the other hosts that their copy of the locked page is out of date. The other host will acquire an updated copy of the page the next time it is needed. Techniques other than locking can be used to keep the cache copy of a page consistent between hosts. For example, the one host may be considered the host-of-record or page-owner, which other hosts that want to update the page must contact before updating the page.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

It will be appreciated that the system of FIG. 1 is merely exemplary, and many other types of configurations may usefully employ the current invention to be described in reference to the remaining drawings.

Figure 2:
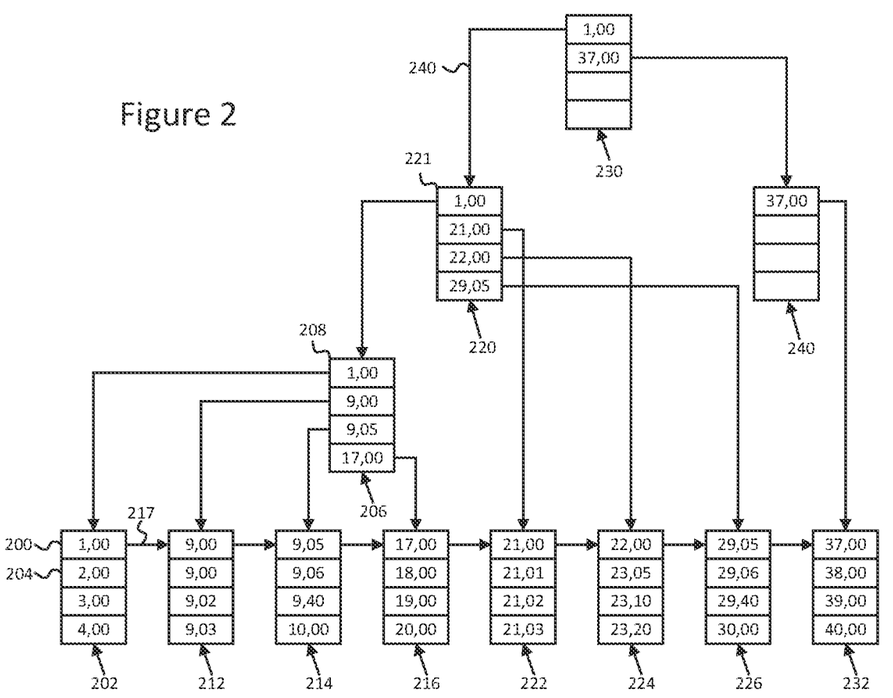
FIG. 2 is an example of a B+-tree constructed from sorted records.

FIG. 2 is an example of a B-tree constructed from sorted records of a database. According to the method of FIG. 2, a stream of records is received such that a known relationship exists between the index values of sequentially received records. In the illustrated example, the stream of records is sorted so that the index values appear in ascending order.

The first received record 200 has an index value of "1,00". This record is stored in a leaf node that is allocated on page 202 of storage space. In this example, the page stores up to four records. In practice, each page may store an arbitrarily large number of records that is dictated by page size. The next received record 204 has an index value of "2,00", and is also stored on page 202. Since the records are in a sorted stream, there is no need to reserve space to insert any records between this and the previously received record, so the records may be stored contiguously on the page. Two more records are received before the page is filled.

After page 202 is filled, the first non-leaf node may be created and is allocated another page 206 of storage space. The first entry 208 on page 206 includes the index value "1,00" of the first record on page 202. In another embodiment, this entry might include the last index value "4,00" that appears on page 202. In still another embodiment, this entry may contain both index values "1,00" and "4,00". Entry 208 further stores a pointer to page 202, represented by pointer 210. This pointer may be an address, an offset, or any other type of indicia that uniquely identifies page 202. In a preferred embodiment, the pointer will provide information allowing for efficient retrieval of page 202. After page 206 has been created, processing continues by creating leaf nodes on pages 212, 214, and 216, each of which is pointed to by an entry on page 206.

According to one embodiment, the leaf nodes of the tree of FIG. 2 may each store a pointer to a leaf node that is ordered next in the sort order based on the index values. For example, page 202 stores a pointer 217 to page 212, and so on. This allows a search to continue from one leaf node to the next without requiring traversal of the tree hierarchy. This makes the search more efficient.

After the fourth (last) entry is created on page 206, another non-leaf node is created on newly allocated page 220. This new node includes an entry 221 that points to page 206, and that stores an index value from the first entry of page 206. In another embodiment, the first entry on page 220 could store the index value from the last entry of page 206. Creation of leaf nodes may then continue with the creation of additional leaf nodes on pages 222, 224, and 226. Corresponding entries are created on page 220.

The foregoing process continues when page 220 is full. That is, page 230 is allocated to store another non-leaf node that points to page 220, and that further points to leaf nodes such as node 232.

In general, the present invention applies to any database management system that supports a secondary index capability. It applies to both database management systems that use page level recovery and that use record level recovery. The information required to build the secondary index appears on the data pages as well as on the audit trail. The mechanism for representing the information differ, and the processing described below must be tailored accordingly. It also applies to database management systems that use multi-version concurrency control and use two-phase locking and timestamp ordering. Again, the information required to build the secondary index appears on the data pages as well as on the audit trail. The mechanisms for representing the information differ, and the processing described below must be tailored accordingly.

The invention consists primarily of two phases to create and populate the secondary index without the need to lock the table during creation of the index. Phase A creates the index for rows already in the table at the time that part of the table is processed. During Phase A, access to the database is maintained. Phase B applies additional changes to the secondary index as a result of subsequent changes to the table that occurred during Phase A while access to the database was maintained.

Several specific use cases are discussed: 1) the complete coverage scenario; 2) the forward moving scenario; 3) the sliding window scenario; 4) the range scenario; and 5) the append scenario.

In the complete coverage scenario, each row in the primary key B-tree has a corresponding row in the secondary index B-tree. In prior methodologies, the secondary index B-tree is created from an already-populated table, the primary key B-tree must be locked to prevent any modifications to the table while the database management system creates the secondary index B-tree and its contents. These modifications are: a) insert a new row into the table; b) delete a row from the table; and 3) update a row in the table. If the primary key B-tree has a significant number of rows, the lock while creating the secondary index prevents others from accessing and modifying the table for an unacceptably long time.

Figure 3:
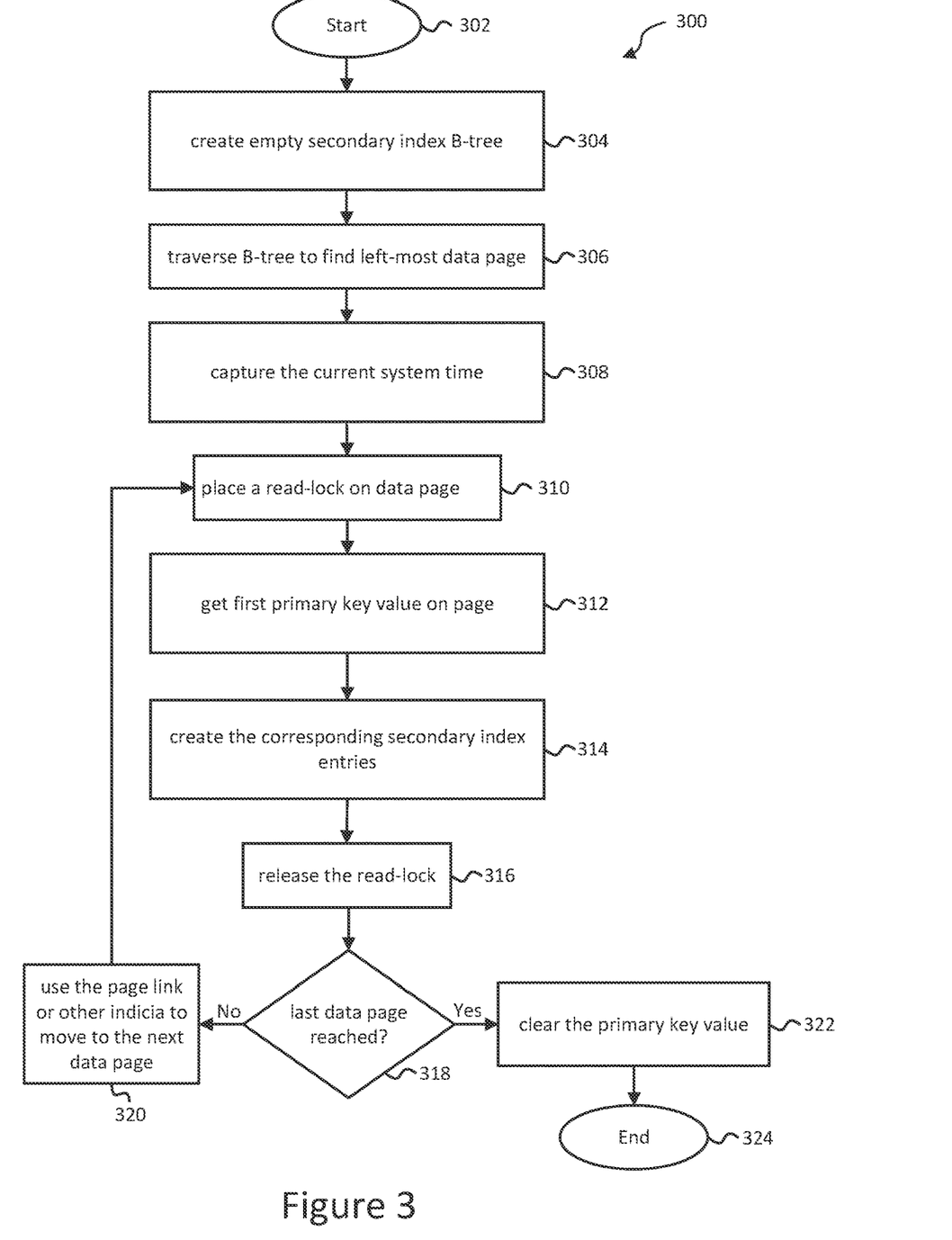
FIG. 3 is a flow diagram illustrating a method of creating a secondary index, according to one example embodiment.
Figure 4:
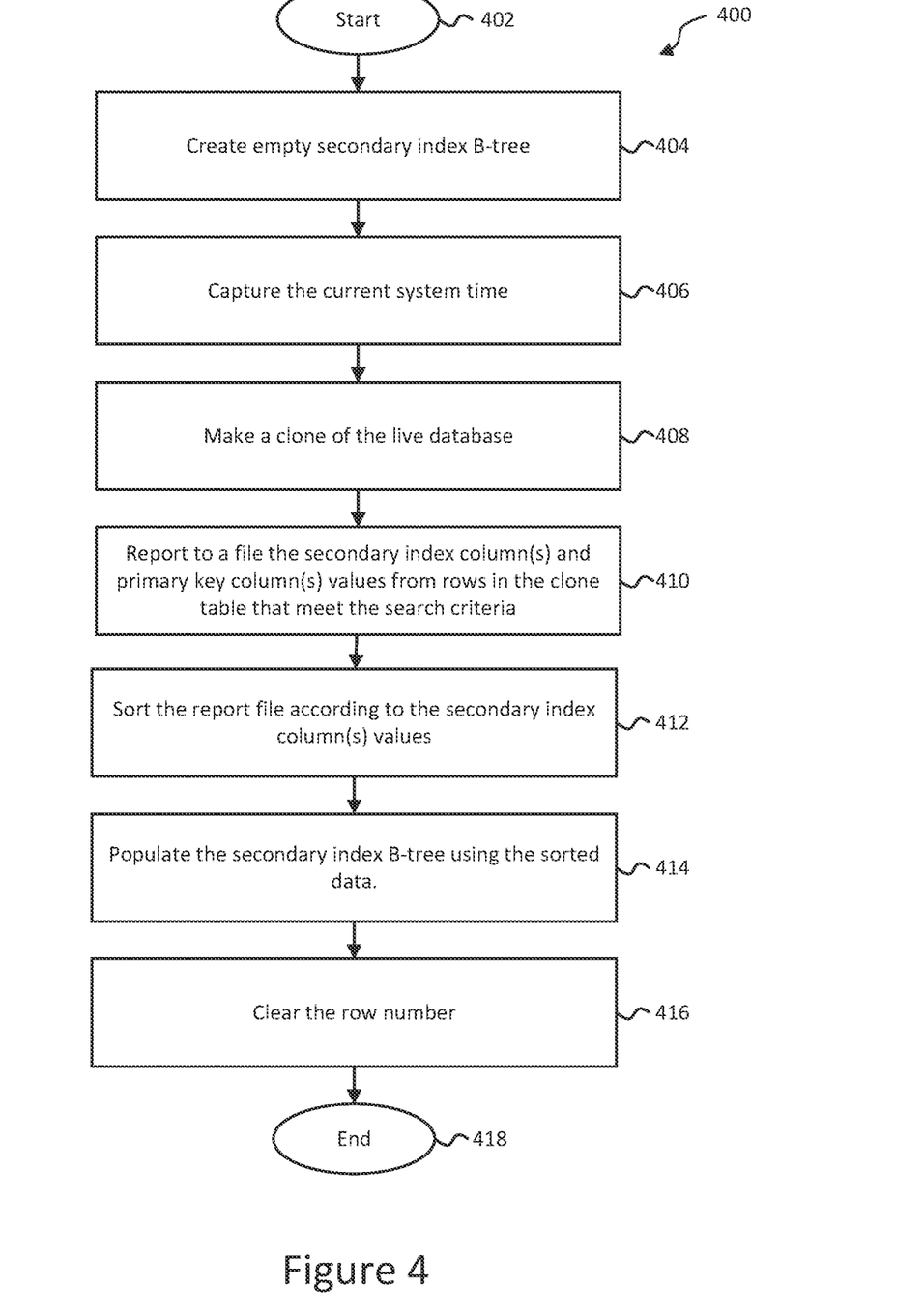
FIG. 4 is a flow diagram illustrating a method of creating a secondary index, according to one example embodiment.

In Phase A, the present invention overcomes the problem with the prior art. The processing begins to populate the secondary index from rows already in the table using one of two approaches as shown in FIGS. 3 and 4. Referring to FIG. 3, the method 300 begins at start 302. At 304, an empty secondary index B-tree is created without making it visible to other database management system processing. This includes not making it visible to other INSERT, UPDATE, DELETE and RETRIEVE processing in the DBMS. At 306, the B-tree is traversed to find the left-most data page i.e., page 202 of FIG. 2. Read-locks are placed on the index pages and data page during the search for the data page; for example place a read lock on page 206 while discovering link 210 to page 202. This prevents any page update to that page from occurring during the search. The read lock is freed immediately after the page's contents have been analyzed and the number of the next page to analyze has been determined i.e., release the lock on page 206 after discovering link 210.

At 308, the current system time is captured and written into control information for the secondary index B-tree. This time is the starting point for having to capture any subsequent table modifications. Any modifications to the primary key B-tree and its data pages will appear in an audit trail at this captured system time or a following, later time. This is also a point to restart processing in the case of a system failure. The audit trail, or database log, keeps an immutable record for updates made to a database. The entries in the audit trail typically appear in time order. Entries containing updates from multiple users are interleaved in the audit trail. Each set of entries for a specific user has a "start" entry, one or more entries containing either "before look" or "after look" images of the values modified by the user, and a final entry indicating the ending action, either "commit" or "rollback". This set of updates is typically described as a "transaction". In theory, the set of updates are "atomic" in that they all get applied or none get applied.

At 310, a read-lock is placed on the data page, preventing other users from updating the page during processing. A read-lock is a type of data-access lock that allows the holder of the lock to read from an object and allows other users to read the same object. The read-lock typically disallows the holder of the lock from updating the object and also disallows other users from updating the object, i.e. it blocks another user from obtaining a write-lock on the object. A write-lock is a type of data-access lock that allows the holder of the lock to read from and update an object and disallows other users from reading or updating the same object.

At 312, the first primary key value on the page is retrieved and written to the B-tree control information. When an error occurs and secondary index processing restarts, for example if the secondary index build process gets rolled back due to a lock conflict, starting at the point in the primary key B-tree where this row occurs, guarantees that the processing will see all the rows on the data page starting with the row having this primary key value.

At 314, for each row on the page i.e., there are 4 rows on page 202 from FIG. 2, extract the data necessary to create a corresponding secondary index entry and insert them into the secondary index B-tree. At 316, the read-lock is released for the page. At 318, it is determined if the last page has been reached, and if not then processing continues at 320. At 320, a page link or other indicia is used to move to the next data page i.e., page 212 of FIG. 2. Processing continues at 310. If at 318, it is determined that the last page has been reached, then processing continues to 322 where the primary key value is cleared that was captured at 312. Processing ends at 324.

Upon completion of the method 300 of FIG. 3, the secondary index has all the foundational data from the rows in the table. However, during the processing of the data pages, other users can make changes to the table using INSERT, UPDATE and DELETE commands. To have the secondary index reflect these changes, the process moves to an audit trail as described below in connection with FIG. 5. Any changes applied to the table must have a COMMIT time after the system time captured above at 308. Thus, changes made after the start time are captured.

In FIG. 4, the second approach or method 400 is disclosed for phase A. This method uses a clone of the live database. Processing begins at start 402. At 404, an empty secondary index B-tree is created without making it visible to other database management system processing, including not making it visible to other INSERT, UPDATE, DELETE and RETRIEVE processing in the DBMS. At 406, the current system time is captured and written into the secondary index B-tree control information. At 408, a clone of the live database is made. The clients' Disaster Recovery (DR) mechanism or other mechanism, such as EMC® Timefinder®, can be used to clone the table's rows to be consistent at a particular point-in-time. The clone can then be made read-only.

At 410, the secondary index and primary key column values from rows in the clone table that meet the search criteria are reported to a file. At 412, the report file is sorted according to the secondary index column values first and by the primary key column values second. At 414, the second index B-tree is populated using the sorted data. One embodiment uses a LOAD INDEX or other fast index loading mechanism to populate the secondary index B-tree. A second embodiment uses a mechanism to read the report file and populate the secondary index B-tree, perhaps a record at a time. Periodically, the row number being processed from the report file is written into the secondary index B-tree control information. This row number provides a starting point to recover the B-Tree population process in the event of a failure. At 416, after the secondary index B-tree has been fully populated with the data from the report file, the row number captured in 414 is cleared from the B-tree control information. Flow ends at 418.

Figure 5:
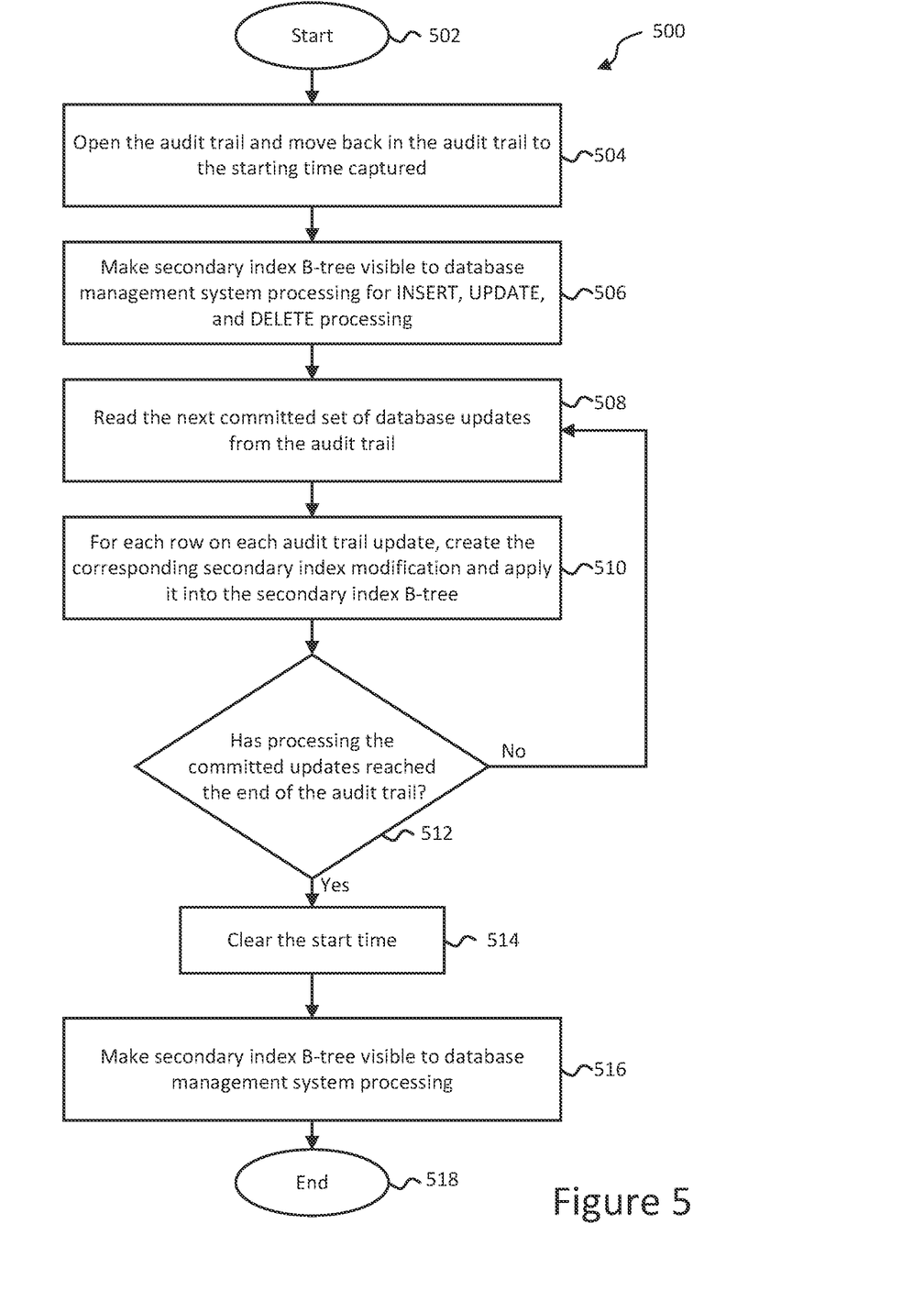
FIG. 5 is a flow diagram illustrating a method of updating a secondary index, according to one example embodiment.

Referring to FIG. 5, a method 500 of implementing phase B is described. The method 500 continues to apply updates to the secondary index as a result of subsequent changes to the table that happened while performing phase A. The method starts at 502. At 504, the audit trail is opened and processing starts at the captured start time from 308 of FIG. 3 or 406 of FIG. 4. At this point in the audit trail, a transaction, trx 1, trx 2 or trx 3, can be in any one of three patterns as shown FIG. 6. Transaction 1 ("trx 1") has made a set of updates a through x and has committed or rolled back those updates prior to the captured system time. These updates are already reflected in the data pages already processed during the methods of FIGS. 3 and 4. Many transactions may have this transaction 1 pattern. Transaction 2 ("trx 2") has not yet started executing at the captured system time. In processing the audit trail, transaction 2 updates will be read and applied for any updates that were committed, not rolled back. Many transactions may have this transaction 2 pattern.

Figure 7:
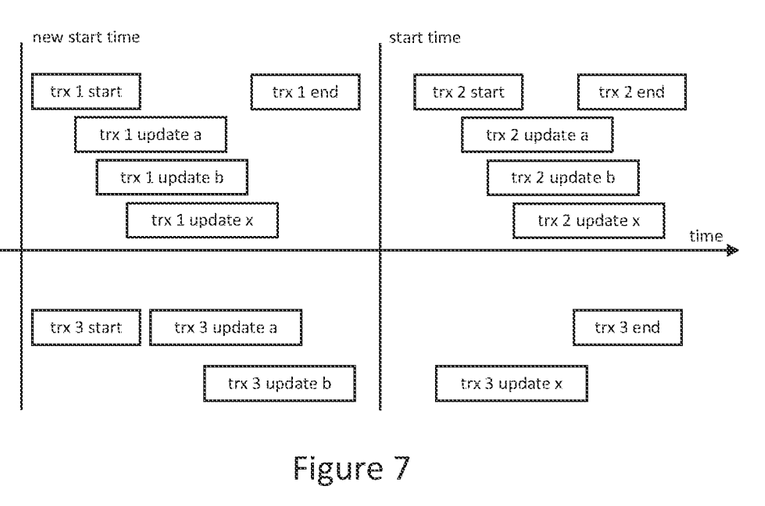
FIG. 7 is an illustration of transactions in an audit trial before and after a start time and a creation of a new start time, according to one example embodiment.

Transaction 3 ("trx 3") is in mid-processing at the captured system time. For all transactions with pattern 3, a new start time must be determined at a prior point in the audit trail that occurs before any transaction 3 data that needs to be included as shown in FIG. 7. Since many transactions may have this transaction 3 pattern, the new start time is created where no audit entries for transactions with pattern 3 appear. This new start time is then written to the secondary index B-tree control information.

Figure 6:
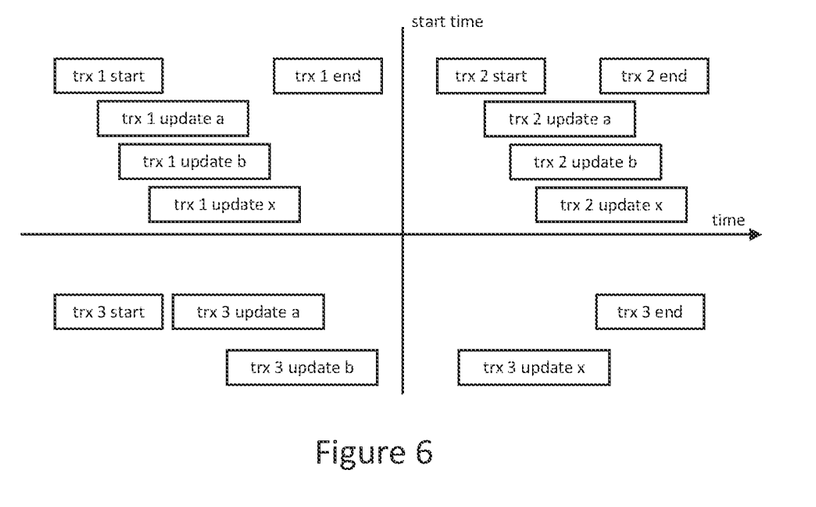
FIG. 6 is an illustration of transactions in an audit trail before and after a start time or captured system time, according to one example embodiment.

Referring back to FIG. 5, at 506, the secondary index B-Tree is made visible to the DBMS processing for INSERT, UPDATE and DELETE processing, but not for RETRIEVE processing. Because not all the primary key B-tree's rows have been processed by this point, the secondary index B-tree cannot yet be used by RETRIEVE processing to accelerate access to the rows in the table. By making the secondary index B-Tree visible for INSERT, UPDATE and DELETE processing, any updates to the primary index B-Tree are reflected in the secondary index B-Tree as well. At 508, each set of updates related to a specific transaction "trx n" is examined. If the trx n end record indicates a rollback, discard the updates from consideration. If the trx n end record indicates a commit, capture the individual updates a through x, such as illustrated in FIGS. 6 and 7.

Referring back to FIG. 5, at 510, for each update for each row for the updates collected for trx n, create the corresponding secondary index entry and insert it into the secondary index B-tree. In one embodiment, transaction pattern 1 updates are re-applied to the secondary index B-tree as they are encountered. A second embodiment collects only the transaction pattern 3 updates and applies them during the processing. The processing always applies the transaction pattern 2 updates because they occurred after the captured system time. The processing must accommodate the situation where an entry for a row already exists in the secondary index B-tree. In one embodiment, the processing detects this situation and skips the row. In the second embodiment, the processing simply replaces the secondary index B-tree entry for the row with the new information from the audit tail. In either embodiment, no error is generated when detecting this situation.

At 512, it is determined if processing the committed updates from the audit trail has reached the end of the audit trail. If it is determined it has not, then flow branches "NO" to 508 and processing continues. During Phase B, the audit trail is still being appended to because the table is accessible. In other words, while processing the audit trail, the audit trail is also being appended to by further subsequent changes to the data. The processing must therefore continue to capture all subsequent updates. At 512, if it is determined the end of the audit trail has not been reached, then flow branches "NO" and processing continues at 508. If it is determined the end of the audit trail has been reached, then flow branches "YES" to 514. Because the secondary index B-Tree was made visible at step 506 for INSERT, UPDATE and DELETE processing, the processing in 508, 510, and 512 eventually catch up to any updates made in the normal course of processing since step 506. At 514, the captured system time is cleared from the secondary index B-tree control information to indicate completion of the secondary index B-tree. At 516, make the secondary index B-tree visible for all database management system processing, including INSERT, UPDATE, DELETE and RETRIEVE processing.

A forward moving window scenario is also considered. This scenario applies to the behavior of certain kinds of databases. For example, bank transactions move forward through time as do cruise bookings, airline reservations, theater tickets, hotel reservation, restaurant reservations, etc. In this scenario, a user may want the DBMS to create a secondary index for the search where the date is greater than or equal to the index creation start time. Or, the user does not limit the date range in query because the user knows they will only get newer information as the older information will age out. For this scenario, there is no need to implement a way to keep the index off-line because only new rows will be included anyway. The secondary index continues to grow as new rows are added at the end and shrinks as the DBMS deleted old rows from the beginning.

As such, this forward moving window scenario uses a subset of FIGS. 3 and 4. Under this scenario at 304 of FIG. 3, the empty secondary index B-tree is made immediately visible to other INSERT, UPDATE, DELETE, and RETRIEVE processing in the DBMS. No other processing steps are needed so flow ends. Likewise, at 404 of FIG. 4, the empty secondary index B-tree is made immediately visible to other INSERT, UPDATE, DELETE, and RETRIEVE processing in the DBMS. The DBMS UPDATE and DELETE processing must be modified so it does not issue an error or warning when a secondary index B-tree entry cannot be found, corresponding to the row being updated or deleted.

A sliding window scenario is also disclosed. This scenario also applies to the behavior of certain kinds of databases. For example, bank transactions move forward through time. The difference between forward moving and the sliding window is that the sliding window allows the user to specify a starting point from which the secondary index is to be built, for example, starting 1 month ago. The secondary index continues to grow as new rows are added "at the end" and shrinks as the DBA deletes old rows "from the beginning" of the sliding window.

The sliding window scenario uses a subset of FIGS. 3 and 4. Under this scenario at 306, rather than starting the data page analysis at the left-most data page, the B-tree is searched to find the starting point indicated by the user, that is, the first row in the table that matches the starting criteria. The processing then continues through the remainder of method 300 of FIG. 3. In FIG. 4, at 410, use the starting point indicated by the user in selecting the rows for the report. The processing then continues through the remainder of method 400. The DBMS UPDATE and DELETE processing must be modified so it does not issue an error or warning when a secondary index B-tree entry cannot be found, corresponding to the row being updated or deleted.

A range scenario is also disclosed. This scenario applies, for example, when a user wants to perform analysis for all data in a table or set of tables related to a particular time range in the past, perhaps 6 months before to 6 months after some particular event. The primary B-tree data might either be static or slowly changing for this range in the past. Once the secondary index is created its rate of change is slow as compared to the rate of change in the primary key B-tree rows.

The range scenario uses a subset of the processing from FIGS. 3 and 4. First, perform either 304 of FIG. 3 or 404 of FIG. 4. Because the rows of interest were inserted or modified in the past, the remaining steps can be skipped. In FIG. 5, at 504, instead of moving backward in the audit trail to the captured start time, move backward in the audit trail to the starting point specified by the user. Perform steps 506-510 as in the complete coverage scenario. At 512, the decision is whether the ending point specified by the user has been reached rather than all committed updates processed. The method continues with steps 514 and 516. The database management system's UPDATE and DELETE processing must be modified so it does not issue an error or warning when a secondary index B-tree entry cannot be found, corresponding to the row being updated or deleted.

An append scenario is also disclosed. In this scenario, the user wants to apply all updates, which have occurred during some specific time interval, to an existing secondary index. In this scenario, the invention begins with the Phase B processing described above, applying updates from the audit trail, starting and ending at the times specified by the user. This differs from the range scenario described above because in the append scenario, the secondary index already exists. In other words, for a specified secondary index, the DBMS does not make secondary index updates for INSERT, UPDATE or DELETE operations, thereby decreasing the amount of work done by the DBMS for an INSERT, UPDATE or DELETE operation and increasing the throughput of the transactions during normal processing. The mechanism described herein updates the secondary index when requested by the user. The DBMS uses the secondary index, in its current state of completeness and as appropriate, for RETRIEVE operations.

The user may choose to make the file containing the secondary index recoverable, that is, by indicating that all writes to the file containing the secondary index have a corresponding write to the audit trail. Then, when a recovery action is required, recover the set of files for the table back to the consistent state. If the process for building the secondary index is still in progress, there is the captured start time in the secondary index B-tree control information. If there is a primary key value in the secondary index B-tree control information, use it to traverse the primary key B-tree to the data page containing the primary key value and resume the processing according to FIG. 3, starting with 310. Continue with the processing of FIG. 5 at 504.

If there is not a primary key value in the secondary index B-tree control information and there is data already written to the secondary index, resume the processing according to FIG. 5 at 504. If there is no primary key value in the secondary index B-tree control information and there is no data yet written to the secondary index, resume the processing in FIG. 3 at 306. Continue with the processing of FIG. 5 starting with 504.

During the phase A, first approach, the user may choose to make the file containing the secondary index non-recoverable, by indicating that writes to the file containing the secondary index have no corresponding audit trail entries. At the completion of the creation of the secondary index, the user must make a snapshot of the completed file, often called a dump of the file. It is recommended that the user also switch recovery of the file to TRUE so it can be managed in line with other files that make up the table and its indices.

When a recovery action is required during the creation of a secondary index, simply redo the creation of the secondary index. Make the secondary index not visible to INSERT, UPDATE, DELETE and RETRIEVE processing, erase the file containing the partially-created secondary index, and resume the processing in FIG. 3 at 306 and continue the processing of FIG. 5 at 506.

During the phase A, second approach, the user may choose to make the file containing the secondary index recoverable, that is, by indicating that all writes to the file containing the secondary index have a corresponding write to the audit trail. Then, when a recovery action is required, recover the set of files for the table back to a consistent state. If the process for building the secondary index is still in progress, there is the captured start time in the secondary index B-tree control information.

If there is a row number captured at 414 of FIG. 4 in the B-tree control information, use it to position to a point in the report file and resume the processing according to FIG. 4 starting at step 414. Continue with the processing of FIG. 5 starting with step 504. If there is no row number captured at 414 of FIG. 4 in the B-tree control information and there is data already written to the secondary index, resume the processing according to FIG. 5 starting with step 504.

If there is no row number captured at 414 of FIG. 4 in the B-tree control information and there is no data yet written to the secondary index, resume the processing according to FIG. 4 starting at 406. Continue with the processing of FIG. 5 starting at 504.

The user may choose to make the file containing the secondary index non-recoverable, that is, by indicating that writes to the file containing the secondary index have no corresponding audit trail entries. At the completion of the creation of the secondary index, the user must make a snapshot of the completed file, often called a dump of the file. It is recommended that the user also switch recovery of the file to TRUE so it can be managed using prior art mechanisms, in line with the other files that make up the table and its indices.

When a recovery action is required during the creation of a secondary index, simply redo the creation of the secondary index. Make the secondary index not visible to INSERT, UPDATE, DELETE, and RETRIEVE processing, erase the file containing the partially-created secondary index, and resume the processing according to FIG. 4 starting at 406 and continue with the processing of FIG. 5 starting at 504.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. A serverless environment, such as the cloud, could also be used.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. A serverless environment, such as the cloud, could also be used.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of making a file containing a secondary index for a B-Tree in a database recoverable during building of the secondary index, the method comprising:
    capturing a current system time as a captured system time and writing the captured system time to control information for the secondary index, wherein the current system time is a starting point for having to capture any subsequent table modifications corresponding to the B-tree;
    finding writes to the file containing the secondary index; writing the writes to an audit trail, wherein the writes to the file containing the secondary index correspond to the writes to the audit trail, making the file recoverable;
    using the captured system time in the control information for the secondary index as a start time for recovery, wherein the audit trail keeps a record for updates made to the database, the entries in the audit trail appear in time order, and the entries from multiple users are interleaved in the audit trail;
    determining if there is a primary key value in the control information;
    using a primary key value in the control information to traverse the B-tree to a data page containing the primary key value;
    placing a read-lock on the data page;
    creating a corresponding secondary index entry from the data page in the secondary index; and
    releasing the read-lock.

2. The processor-based method according to claim 1, further comprising if there is not a primary key value determined and there is data already written to the secondary index, opening the audit trail and resume writing the writes to the audit trail starting at the captured system time.

3. The method according to claim 2, further comprising: making the secondary index visible to the DBMS for INSERT, UPDATE and DELETE processing;

reading a next committed set of database updates from the audit trail;

creating a secondary index modification for each row on each audit trail update and applying it to the secondary index; and clearing the captured system time from control information for a B-tree to indicate completion; and making the secondary index visible to the DBMS for all processing.

4. The processor-based method of claim 3, further comprising determining if the end of the audit trail has been reached.

5. The processor-based method of claim 4, further comprising if the end of the audit trail has been reached then proceeding with clearing the captured start time.

6. The processor-based method of claim 5, further comprising if the end of the audit trail has not been reached returning to reading a next committed set of database updates from the audit trail.

7. The processor-based method of claim 6, further comprising, continuing the steps until the end of the audit trail is processed through a current system time.

8. The processor-based method of claim 2, further comprising, after opening the audit trail, determining if any committed updates started before the captured system time.

9. The processor-based method of claim 8, further comprising if it is determined that no committed updates started before the captured system time then proceed to writing the writes to the audit trail starting at the captured system time.

10. The processor-based method of claim 9, further comprising if it is determined that committed updates started before the captured system time, then creating a new start time and resume writing the writes to the audit trail starting at the new start time instead of the captured system time.

11. A computer program product, comprising: a non-transitory computer readable medium comprising instructions which, when executed by a processor of a computing system, cause the processor to perform the steps of:

making a file containing a secondary index for a B-Tree in a database recoverable during building of the secondary index, comprising:

capturing a current system time as a captured system time and writing the captured system time to control information for the secondary index, wherein the current system time is a starting point for having to capture any subsequent table modifications corresponding to the B-tree;

finding writes to a file containing the secondary index; writing the writes to an audit trail, wherein the writes to the file containing the secondary index correspond to the writes to the audit trail, making the file recoverable;

using the captured system time in the control information for the secondary index as a start time for recovery, wherein the audit trail keeps a record for updates made to athe database, the entries in the audit trail appear in time order, and the entries from multiple users are interleaved in the audit trail;

determining if there is a primary key value in the control information;

using a primary key value in the control information to traverse the B-tree to a data page containing the primary key value;

placing a read-lock on the data page;

creating a corresponding secondary index entry from the data page in the secondary index; and releasing the read-lock.

12. The computer program product d according to claim 11, further comprising if there is not a primary key value determined and there is data already written to the secondary index, opening the audit trail and resume writing the writes to the audit trail starting at the captured system time.

13. The computer program product according to claim 12, further comprising:

making the secondary index visible to the DBMS for INSERT, UPDATE and DELETE processing;

reading a next committed set of database updates from the audit trail;

creating a secondary index modification for each row on each audit trail update and applying it to the secondary index; and clearing the captured system time from control information for a B-tree to indicate completion; and making the secondary index visible to the DBMS for all processing.

14. The computer program product of claim 13, further comprising determining if the end of the audit trail has been reached.

15. The computer program product of claim 14, further comprising if the end of the audit trail has been reached then proceeding with clearing the captured start time.

16. The computer program product of claim 15, further comprising if the end of the audit trail has not been reached returning to reading a next committed set of database updates from the audit trail.

17. The computer program product of claim 16, further comprising, continuing the steps until the end of the audit trail is processed through a current system time.

18. The computer program product of claim 12, further comprising, after opening the audit trail, determining if any committed updates started before the captured system time.

19. The computer program product of claim 18, further comprising if it is determined that no committed updates started before the captured system time then proceed to writing the writes to the audit trail starting at the captured system time.

20. The computer program product of claim 19, further comprising if it is determined that committed updates started before the captured system time, then creating a new start time and resume writing the writes to the audit trail starting at the new start time instead of the captured system time.

* * * * *